United States Patent [19]

Sea

[11] Patent Number: 4,930,255
[45] Date of Patent: Jun. 5, 1990

[54] DOOR WINDOW ASSEMBLY

[76] Inventor: Ho T. Sea, No, 4, Lane 21, Hou Chuang Rd., Taichung City, Taiwan, R. O. C., Taiwan

[21] Appl. No.: 355,336

[22] Filed: May 23, 1989

[51] Int. Cl.[5] ............................................. E05C 7/02
[52] U.S. Cl. ...................................... 49/63; 49/349; 49/351
[58] Field of Search .................. 49/63, 349, 351, 350; 296/146

[56] References Cited

U.S. PATENT DOCUMENTS

| | | | |
|---|---|---|---|
| 1,167,748 | 1/1916 | Greenleaf | 49/63 X |
| 1,986,700 | 1/1935 | Zimmerman | 49/63 |
| 2,848,218 | 8/1958 | Leslie et al. | 49/349 |
| 4,331,359 | 5/1982 | Sheldon | 49/63 X |
| 4,471,251 | 9/1984 | Yamashita | 49/349 X |
| 4,554,763 | 11/1985 | Dauvergne | 49/349 |
| 4,773,697 | 9/1988 | Svensson | 49/63 X |

Primary Examiner—Philip C. Kannan
Attorney, Agent, or Firm—Bacon & Thomas

[57] ABSTRACT

An electric door window assembly incorporating two glass plates of different properties in which the desired one or both plates can be selectively raised. A pair of frames are fixedly mounted on the car door. Two pinions are engaged to and driven by a worm wheel which is in mesh with a motor driven worm. The pinions, each of which engages a toothed element to raise or lower a movable support rail with a glass plate mounted on it, are rotatable by the worm wheel through a pair of clutches, with each clutch being disposed between the worm wheel and a corresponding pinion, and selectively electromagnetically actuated to permit the worm wheel to drive the corresponding pinion in order to raise or lower the desired glass plate.

6 Claims, 4 Drawing Sheets

DOOR WINDOW ASSEMBLY

BACKGROUND OF THE INVENTION

The present invention relates generally to door windows. More particularly, the present invention relates to electric door window assemblies in which two or more types of assorted windows are disposed on the same car door. For example, one transparent, and one dark-colored or reflective filmed window could be used.

Electric door windows having only one glass plate mounted thereon are well-known. Once a glass plate is mounted on the door window, it is seldom changed, even if it is not suitable to meet the practical needs of the user.

It would be convenient if there were more than one glass plate, each with a different or specific property, disposed on the same door window, which could be chosen, according to the practical needs of the user. For example, if the passenger wants to see more clearly the outside of the car when he/she is seated in the car, providing only a single lowerable window with a dark gray glass plate is unsuitable. It is more preferred to provide another transparent glass plate which can be conveniently raised and then the dark gray glass plate could be lowered to achieve this end. Similarly, if the passenger intentionally wants to be concealed from viewers outside of the car, he or she can then raise the dark gray or reflective filmed glass plate instead of the transparent one.

SUMMARY OF THE INVENTION

A primary object of this invention is to provide a door window assembly having two or more glass plates, with each one possessing different properties, for selective utilization as desired one by a car passenger.

Another object of this invention is to provide an electric door assembly which is easy to manufacture and effective in construction.

These and additional objects, if not set forth specifically herein, will be readily apparent to those skilled in the art from the detailed description provided hereinbelow, with appropriate reference to the accompanying drawings.

DETAILED DESCRIPTION OF THE PREFERRED EMBODIMENT

Figure 1:
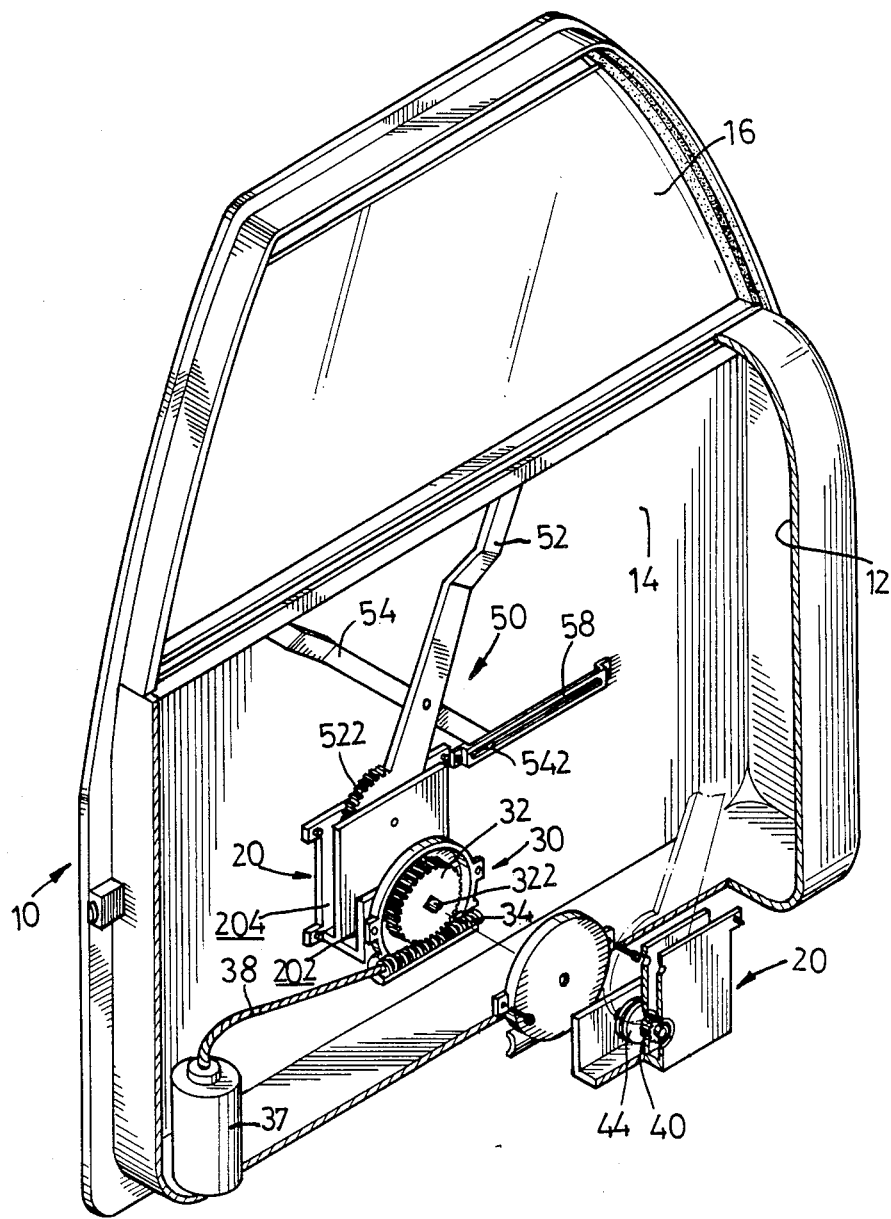
FIG. 1 is a perspective view of an electric door window assembly in accordance with the present invention, partly cut-away and exploded.
Figure 2:
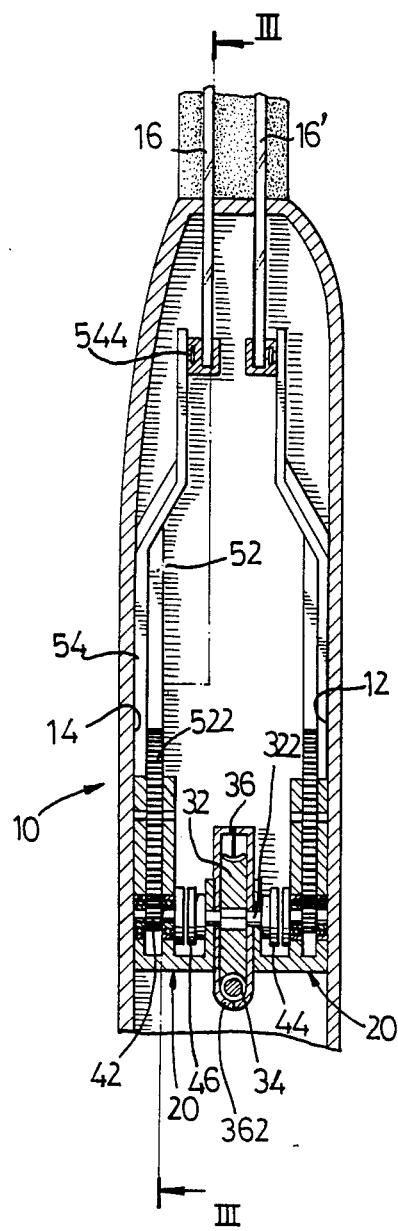
FIG. 2 is a cross-sectional view of an electric door window assembly in accordance with the present invention.

Referring now to the drawings, and more particularly to FIGS. 1 and 2, there is shown a door window assembly which incorporates the preferred embodiment of the present invention and is mounted on the inside of a car door 10. The car door 10 has generally two inside walls 12, 14 opposing each other. The door window assembly comprises a pair of frames 20 which can be fixed on a first inner wall 12 and a second inner wall 14, respectively. Each of the frames 20 comprises a first compartment 202 for receiving a clutch 44 or 46, and a second compartment 204 for receiving a pinion 40 or 42. It is noted that the clutches 44, 46, which are disposed to couple a worm wheel 32 with the pinion, are selectively electromagnetically actuated. Since the mechanism (not shown) for actuating the clutches is conventional and is not a part of this invention, it will not be further described herein.

A main driving means 30 having a worm wheel 32 in mesh with a worm 34 and a cover 36 encasing both the worm wheel 32 and the worm 34 is disposed between the pair of frames 20. The worm wheel 32 has a shaft portion 322 rotatably supported by the pair of frames 20. The electromagnetically actuated clutches 44, 46 are operable by a conventional control means (not shown) to couple the pinion 40 or 42 with the shaft portion 322 so that the pinions 40, 42 can be driven by the worm wheel 32, separately or concurrently. The worm 34 is rotated by a motor 37 via a mechanical power transmission line 38. The worm 34, in turn, rotates the worm wheel 32. The cover 36 is composed of two mirror image parts which are fixedly secured together between the pair of frames 20. Each of the parts has a semi-cylindrical portion 362 at a lower portion thereof for receiving and rotatably securing the worm 34. The first and second pinions 40, 42 are rotatably mounted on the pair of frames 20 at opposite sides of the worm wheel 32, respectively. The first clutch 44 and the second clutch 46 are disposed between the worm wheel 32 and the first and second pinions 40, 42 respectively, such that the worm wheel 32 transmits its rotational movement either through the first clutch 44 to the pinion 40, or through the second clutch 46 to the pinion 42, or both as seen in FIG. 2.

Figure 3:
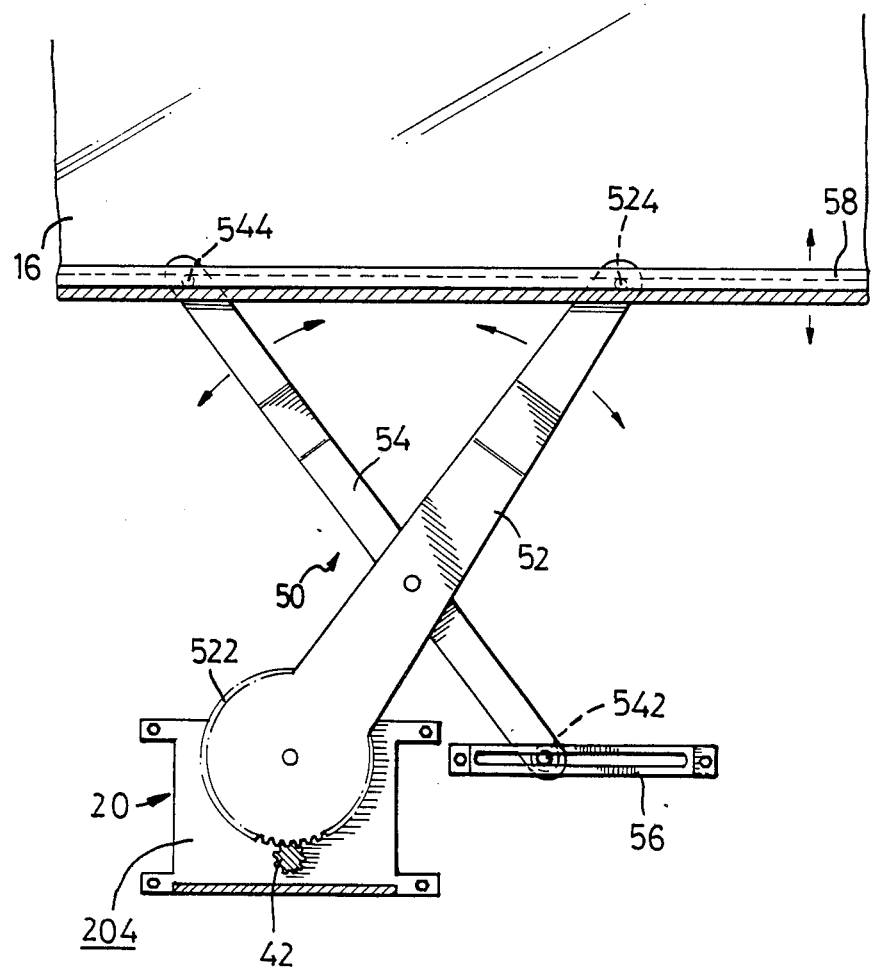
FIG. 3 is a side elevational view taken along line III—III of FIG. 2.
Figure 4:
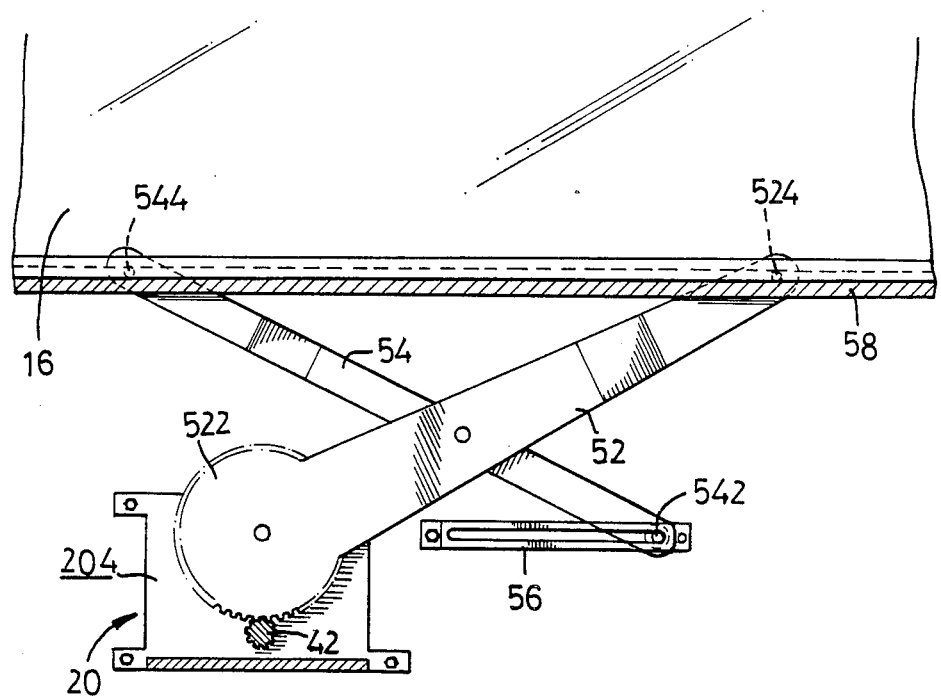
FIG. 4 is a view similar to FIG. 3, showing the door window in a lowermost position.

Referring to FIGS. 3 and 4, a raising means 50, which comprises a toothed element 52, and a secondary element 54 pivotally connected to element 52 for raising or lowering a glass plate 16 are located above corresponding pinion 40 or 42. Each of the toothed elements 52 has a toothed end 522 rotatably fixed on a corresponding frame 20. The toothed end 522, which is gear-shaped, meshes with and is driven by corresponding pinion 40 or 42. Another end of the toothed element 52 is preferably a laterally T-shaped pin 524 which slidably mounts on a substantially horizontal support rail 58. A lower end 542 and an upper end 544 of the secondary element 54 are slidably disposed within a stationary guide rail 56 and the movable support rail 58, respectively. The glass plate 16 is supported by the movable support rail 58 and therefore is raisable by moving the horizontal support rail 58 upward.

FIG. 3 shows the horizontal support rail 58 being supported by the toothed element 52 and the secondary element 54. As the toothed end 522 of the toothed element 52 is driven by the pinion 40 or 42, the toothed element 52 is rotated so that the T-shaped pin 524 is slidable on the support rail 58 in order to raise or lower the support rail 58 as determined by the direction of rotation of the pinion 40 or 42. The toothed element 52 and the secondary element 54 may be pivotally connected together by a pin. Therefore, the secondary element 54 is slidably rotatable, with the lower and upper ends 542, 544 guided by the stationary guide rail 56 and the movable support rail 58, respectively. The secondary element 54 also supports the movable support rail 58 which has the glass plate 16 mounted thereabove.

FIG. 4 shows the movable support rail 58 lowered to a position such that the lower end 542 of the secondary element 54 is stopped by a length limit of the stationary guide rail 56. It is noted that both a highest and a lowest position of the movable support rail 58 can be determined by the length limit of the stationary guide rail 56, or by disposing limit switches (not shown) thereon, if so desired.

Referring again to FIG. 2, both the toothed elements 52 and secondary elements 54 are suitably bent inward, or toward each other, and then extend upward at upper portions thereof for reducing the width of the space between the glass plates 16 and 16' mounted thereon. Thus, even if the door 10 gradually narrows to an upper end thereof, two or more glass plates 16 (or 16') can still be suitably mounted on the door 10.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as shall fall within the scope of the appended claims.

I claim:

1. A door window assembly for mounting on the inside of a car door (10), the car door (10) having inner walls (12,14), said door window assembly comprising:
   a pair of frames (20) being respectively fixed on first and second inner walls (12, 14) of the car door (10);
   a main driving means (30) having a worm wheel (32) in mesh with a worm (34), said worm wheel (32) being rotatably supported by said pair of frames (20), said worm (34) being rotated by a motor (37) so as to drive said worm wheel (32);
   a first and a second pinions (40, 42) being respectively rotatably mounted on said pair of frames (20) at opposite sides of said worm wheel (32), a first and a second clutches (44, 46), said first and second pinions (40,42) each being selectively engageable with and rotatable by said worm wheel (32) through a corresponding clutch (44, 46); said first and second clutches (44, 46) being selectively driven by said worm wheel (32); and
   at least two raising means (50), each means (50) for raising and lowering a glass plate (16, 16') supported thereon, said raising means (50) each comprising a toothed element (52) and a secondary element (54) pivotally connected together, each said toothed element (52) being rotatably mounted on one of said frames (20) and being rotatable by a corresponding pinion (40, 42), said secondary element (54) comprising a lower end (542) and an upper end (544) slidably disposed within a stationary guide rail (56) and a movable support rail (58), respectively.

2. A door window assembly for mounting on the inside of the car door (10) as claimed in claim 1, wherein each of said frames (20) comprises a first compartment (202) for receiving a clutch (44 or 46) and a second compartment (204) for receiving a corresponding pinion (40, 42), each clutch (44, 46) being selectively engageable to transmit a rotational movement of said worm wheel (32) to its corresponding pinion 40, 42).

3. A door window assembly for mounting on the inside of the car door (10) as claimed in claim 1, wherein each of said toothed elements (52) includes a toothed end (522) rotatably secured to said frame (20) and disposed in meshed engagement with a corresponding pinion (40, 42) for rotation thereby, and another end provided with a laterally T-shaped pin (524) thereon, with pin (524) being slidably secured to said movable support rail (58).

4. A door window assembly for mounting on the inside of the car door (10) as claimed in claim 1, wherein said lower and upper ends (542, 544) of each secondary element (54) are each provided with a laterally T-shaped pin thereon.

5. A door window assembly for mounting on the inside of the car door (10) as claimed in claim 1, wherein both said toothed elements (52) and secondary elements (54) are bent inwardly and upwardly for reducing the width of a spacing between said glass plates (16, 16').

6. A door window assembly for mounting on the inside of the car door (10) as claimed in claim 1, wherein said main driving means (30) comprises a cover (36) defined by two mirror image parts, said parts being secured between said pair of frames (2), each said part having a semi-cylindrical portion (362) for rotatably securing said worm (34).

* * * * *